United States Patent [19]
Mukai et al.

[11] Patent Number: 6,083,459
[45] Date of Patent: Jul. 4, 2000

[54] RESERVOIR AND METHOD FOR STORING ARTICLES

[75] Inventors: Yuji Mukai, Kadoma; Yasuhito Takahashi, Hirakata, both of Japan

[73] Assignee: Matsushita Electric Industrial Co., Ltd., Osaka, Japan

[21] Appl. No.: 09/106,151

[22] Filed: Jun. 29, 1998

[30] Foreign Application Priority Data

Jun. 30, 1997 [JP] Japan .................................. 9-173557

[51] Int. Cl.$^7$ ....................................................... A23B 7/00
[52] U.S. Cl. .................................. 422/40; 422/1; 422/41; 422/105; 426/418; 426/419; 95/54; 99/451; 99/467
[58] Field of Search ..................... 422/1, 40, 41, 422/120, 105, 107, 106; 426/418, 419; 95/54; 204/425, 426, 430; 99/451, 467

[56] References Cited

U.S. PATENT DOCUMENTS

| | | | |
|---|---|---|---|
| 3,937,847 | 2/1976 | Elkins et al. ............................. | 422/40 |
| 4,212,891 | 7/1980 | Fujita et al. ............................. | 422/40 |
| 4,384,935 | 5/1983 | De Jong .................................. | 204/425 |
| 4,957,749 | 9/1990 | Prieels et al. . | |
| 5,118,261 | 6/1992 | Yamauchi et al. ....................... | 204/430 |
| 5,250,169 | 10/1993 | Logothetis et al. ..................... | 204/425 |
| 5,468,508 | 11/1995 | Wu et al. . | |
| 5,484,570 | 1/1996 | Ikeda et al. ............................. | 422/40 |

FOREIGN PATENT DOCUMENTS 04346774  12/1992  Japan .
09187164   7/1997  Japan .

Primary Examiner—Terrence R. Till
Assistant Examiner—Fariborz Moazzam
Attorney, Agent, or Firm—McDermott, Will & Emery

[57] ABSTRACT

The present invention provides a compact-sized reservoir with small power consumption. It suppresses possible oxidation of articles and growths of putrefactious aerobic organisms such as bacteria, fungi and the like, by storing the articles under an atmosphere of reduced oxygen concentration created by an oxygen pump device which makes use of an oxygen ion-conductive film. In a case of storing foods, the disclosed reservoir makes their long-term storing possible. The reservoir in accordance with the present invention uses an oxygen pump device provided with an oxygen ion-conductive electrolyte film and a pair of electrodes formed on the both surfaces thereof.

8 Claims, 7 Drawing Sheets

RESERVOIR AND METHOD FOR STORING ARTICLES

BACKGROUND OF THE INVENTION

The present invention relates to a reservoir for storing articles which is deteriorated by an action of oxygen such as perishable foods, and more particularly to a means for suppressing the deterioration of the articles accommodated in the reservoir by adjusting an oxygen concentration inside the reservoir.

Freshness of perishable foods such as meat is reduced by oxidation. And, majority of bacteria grow under an oxygen atmosphere and thus rot or spoil the foods. On the other hand, some garments and ornaments are discolored by oxidation.

The prior art technology will be described below by taking the foods as an example of the articles which are deteriorated by the action of oxygen.

Conventionally, low temperature reservoirs such as refrigerators or freezers have widely been used in order to suppress possible spoiling or rotting of the foods and to keep their freshness. These low temperature reservoirs need a cooling or freezing system, and thus the reservoirs inevitably have to be large scale. In addition, the running cost is high since the cooling or freezing system is large in power consumption.

Incidentally, an atmospheric gas-adjusted reservoir is partly used as the reservoir especially for professional use. In the atmospheric gas-adjusted reservoir, an atmosphere in a chamber for storage is substituted by an inert gas such as carbon dioxide (See, for instance, "Freshness maintenance of vegetables and fruits appeared in the literatures" (Takeo Shiina, edited by DISTRIBUTION SYSTEMS RESEARCH CENTER CO., LTD. Tokyo JAPAN (1990)).

The atmospheric gas-adjusted reservoir employs a gas cylinder to supply carbon dioxide. Therefore, the reservoir requires a troublesome exchange of gas cylinder.

There is also proposed a means for supplying carbon dioxide which generates carbon dioxide by a combustion of fuel. However, this means requires a troublesome supply of fuel.

The primary object of the present invention is to solve the above-mentioned problems and to provide a reservoir capable of storing articles with a simple equipment.

BRIEF SUMMARY OF THE INVENTION

The present invention suppresses oxidation of the articles and growths of putrefactious aerobic organisms including bacteria and fungi, by storing the articles under an atmosphere with low oxygen concentration created by an oxygen pump device employing an oxygen ion-conductive thin film. In a case of storing the foods, it makes their storage possible for a long term.

The reservoir in accordance with the present invention uses an oxygen pump device comprising an oxygen ion-conductive electrolyte film and a pair of gas-permeable electrodes provided on the both surfaces of the film.

When a voltage is applied between the both electrodes of the oxygen pump device, oxygen existing in the atmosphere is taken in the negatively charged electrode of the oxygen pump device and ionized therein. After moving through the oxygen ion-conductive electrolyte thin film, the generated oxygen ions are reduced to gaseous oxygen at the positively charged electrode and released therefrom. Therefore, it is possible to discharge oxygen inside a container therefrom, by allowing the negatively charged electrode to be exposed to an inside of the container and the positively charged electrode to be exposed to an outside atmosphere.

The oxygen ion-conductive electrolyte film used here may be exemplified as a film of oxides such as $CeO_2$, $ZrO_2$, $Bi_2O_3$, $MgO$, $ThO_2$ or the like, and that of complex oxides such as Ba—Ce—Gd oxides. These films can be formed by a known method such as sputtering method, CVD method, vacuum evaporation method, gel-sol method or the like. Of these means, the sputtering and CVD method can produce a thin film with a preferable precision.

Any of the oxygen ion-conductive materials demonstrates a high oxygen ion-conductivity by heating. Therefore, a heating procedure is required for increasing efficiency of the oxygen pump device. However, in a use for the oxygen pump device of the reservoir as in the present invention, such heating should be avoided as possible, on the contrary.

In the present invention, an oxygen ion-conductive substance in a state of thin film is employed to solve the above-mentioned contradictionaly problems. Thinner the oxygen ion-conductive material, higher the oxygen ion-conductivity. That is, if the thin oxygen ion-conductive material is used, the required area of the oxygen pump device can be reduced. This provides a reduction of the heat capacity or the required operating temperature of the device. Therefore, the quantity of heat required for heating the oxygen ion-conductive material can be reduced. The use of the thin oxygen ion-conductive material with small area also serves for improving the reliability of the oxygen pump device. That is, it can reduce the temperature difference in the substance, and prevent the unevenness in pumping efficiency in the material and the possible damage of the pump due to thermal shock.

As previously-described, by employing the oxygen ion-conductive material in a thin film state, an oxygen pump device suitable for the reservoir can be obtained.

The present invention provides a reservoir comprising:
a container for accommodating articles therein, an oxygen pump device for expelling oxygen in the container to the outside, which comprises: a porous substrate; a gas-permeable first electrode formed on the porous substrate; an oxygen ion-conductive electrolyte film formed on the first electrode; and a gas-permeable second electrode formed on the oxygen ion-conductive electrolyte film, the first electrode being exposed to the inside of the container and the second electrode being disposed to the outside, a heater for heating the oxygen ion-conductive electrolyte film, and a voltage supply device for applying a voltage between the first and second electrodes.

In order to form a uniform oxygen ion-conductive film on the surface of the porous substrate without short-circuiting between the first and second electrodes, it is desirable to make the thickness of the film not less than 0.5 $\mu$m. On the other hand, in order to obtain a sufficient oxygen discharge performance in a practical oxygen pump device, it is desirable to make the thickness of the thin film not more than 10 $\mu$m.

In a preferred mode of the present invention, the reservoir further comprises: a current detection means for measuring a current which flows between the first and second electrodes; and a calculation unit for calculating an oxygen concentration in the container based on the obtained current value. The current value which flows between the first and second electrodes depends on an oxygen concentration of an atmosphere which is in contact with the first electrode, i.e., the atmosphere inside the container. It is therefore possible to calculate the oxygen concentration inside the container by detecting this current value.

In another preferred mode of the present invention, the reservoir further comprises: a voltage detecting means for measuring an electric potential difference between the first and second electrodes; and a calculating unit for calculating an oxygen concentration in the container based on the obtained electric potential. If there is a difference between the oxygen concentration of the atmosphere being in contact with the first electrode and that of the atmosphere being in contact with the second electrodes, the oxygen pump device acts as a concentration cell. The magnitude of the generated electromotive force depends on the difference between the oxygen concentrations of the both atmospheres. It is therefore possible to calculate the oxygen concentration inside the container by measuring a potential difference between the both electrodes, after removing the application of voltage to the both electrodes.

Based on the obtained oxygen concentration inside the container, the output of the oxygen pump device can be controlled, for example.

Although it is possible to suppress the growth of aerobic organism under an atmosphere of low oxygen concentration, strictly anaerobic organism such as botulinus species however grow under the deoxygen atmosphere. In a case where the foods are infected by the strictly anaerobic organisms, the storage of the foods under the deoxygen atmosphere is dangerous since it might conversely promote the growth of the strictly anaerobic organisms. For that reason, by intermittently introducing the outside air into the container and temporally increasing the oxygen concentration inside the container, the strictly anaerobic organisms are sterilized.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the following paragraphs, preferred examples of the present invention will be described in detail with reference to the attached drawings.

Figure 1:
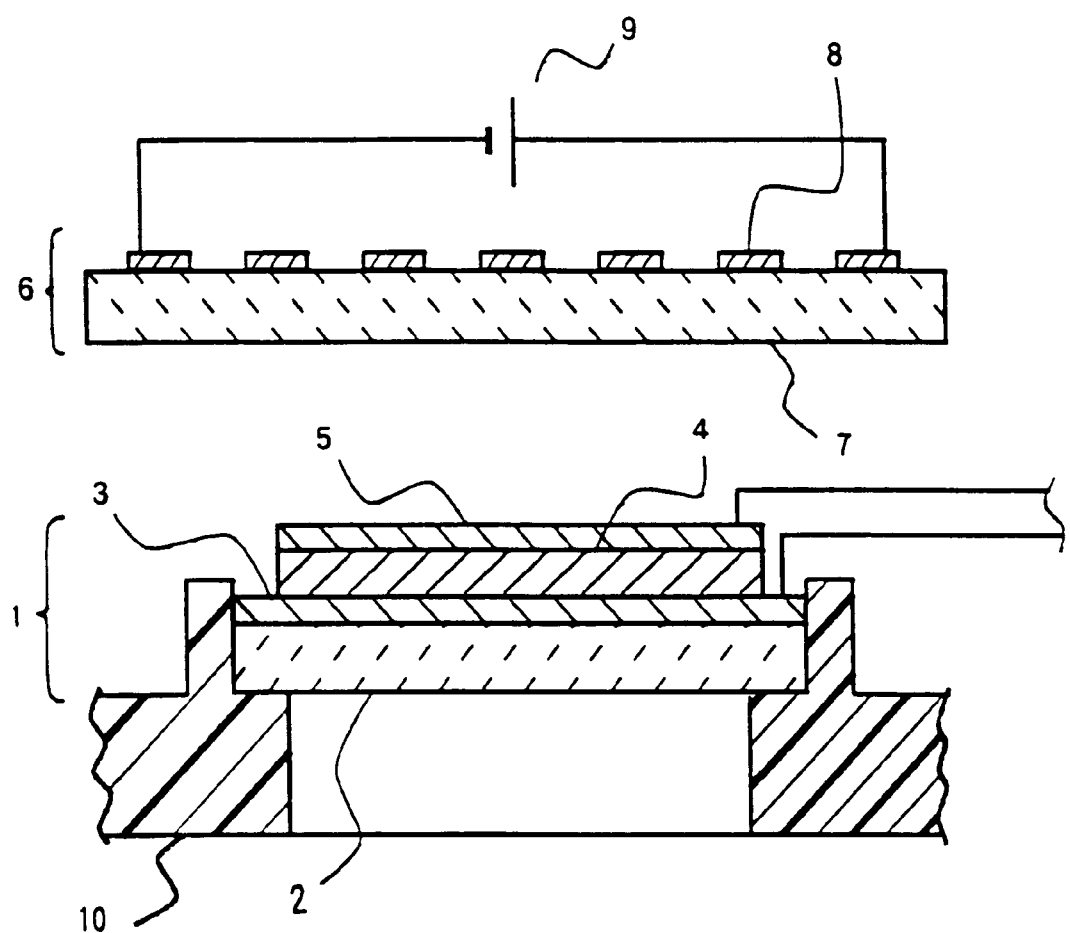
FIG. 1 is a longitudinal cross-sectional view showing an oxygen pump device used in a reservoir in an embodiment of the present invention.

In the following examples, an oxygen pump device 1 having a configuration as shown by FIG. 1 is used in common.

A substrate 2 is a porous body with some gas permeability and is made from a heat-resistant material such as alumina or the like. On the surface of the substrate 2, a first electrode 3, an oxygen ion-conductive film 4 and a second electrode 5 are formed in that order. Both of the first electrode 3 and the second electrode 5 have some gas permeability in common.

A heater unit 6 for heating the oxygen ion-conductive film 4 is arranged so as to face with the second electrode 5. The heater unit 6 is provided with a heat-resistant substrate 7 made of alumina or the like, a heater wire 8 formed thereon and a power source 9 for heating the heater wire 8. The heater wire 8 is formed, for instance, by screen-printing a conductive paste on the substrate 7.

When a voltage is applied between the both electrodes so as to make the first electrode 3 negative and the second electrode 5 positive, while heating the oxygen ion-conductive film 4 by the heater unit 6, negatively-charged oxygen ions in the oxygen ion-conductive film 4 diffuse through the film 4 from the first electrode 3 towards the second electrode 5. The oxygen ions arrived at the second electrode 5 are robbed of their electrons and converted into gaseous oxygen and released to the atmosphere. At the first electrode 3 on the other hand, the oxygen in the atmosphere is ionized and taken into the oxygen ion-conductive film 4. In this manner, the oxygen pump device 1 can transport oxygen in the atmosphere from one side of the oxygen ion-conductive film 4 towards the other side separated by the film 4.

The above-described oxygen pump device 1 is produced in the following manner.

On the substrate 2, the first electrode 3 is formed, for instance, by painting a paste containing platinum fine particles, drying and sintering the painted film. The oxygen ion-conductive film 4 is formed on the surface of the first electrode 3 by sputtering method or the like process. Further, the second electrode 5 is formed on the oxygen ion-conductive film 4 in a manner similar to that for the first electrode 3.

Incidentally, the substrate 2 is porous and has an unevenness on its surface. It is difficult to make the surface roughness of such porous substrate not larger than 0.1 $\mu$m even if the surface is carefully ground and polished. In the actual process for forming the oxygen ion-conductive film 4 with a sufficient stability on the substrate 2 having a surface roughness of 0.1 $\mu$m, it is desirable to make the thickness of the film 4 not less than 0.5 $\mu$m.

If the film 4 is made thicker, it is possible to prevent short-circuiting between the both electrodes 3 and 5. However, such measure reduces the oxygen pumping performance of the oxygen pump device 1.

Figure 2:
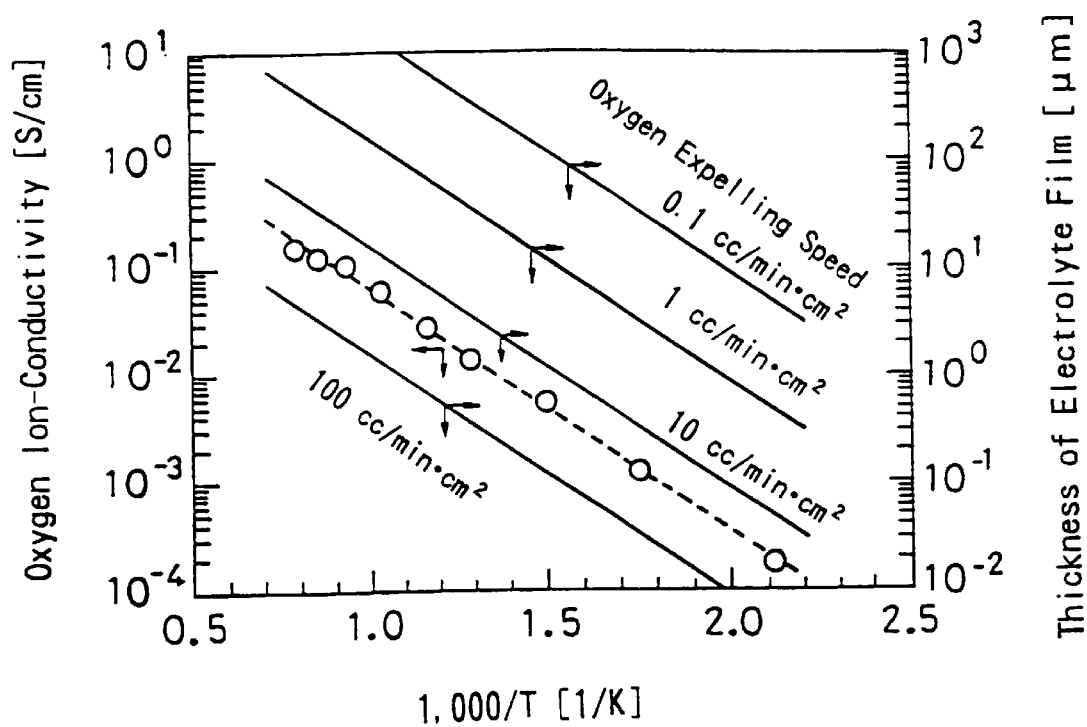
FIG. 2 is a characteristic diagram showing the relationship between the oxygen ion conductivity of the oxygen ion conductive-film and its temperature.

A description will be made on this point by taking an oxygen pump device 1 which uses an oxygen ion-conductive substance of a Ba—Ce—Gd oxide as an example. A pair of electrodes are formed on the both surfaces of a sintered body of the Ba—Ce—Gd oxide having an area of 3.8 $cm^2$ and a thickness of 0.4 mm. When 1 V is applied between the both electrodes while heating the sintered body at 600° C., the oxygen expelling speed as shown in FIG. 2 is obtained.

As the oxygen pump device used in the reservoir described above, it is practically desired to have the oxygen expelling speed of not less than 1 cc/minutes. In addition, it is also desired to make the area of the oxygen pump device not larger than 10 cm$^2$. As described, in order to obtain an oxygen pump device suitable for a practical reservoir, it is desirable to make the thickness of the oxygen ion-conductive film 4 not larger than 10 μm in general, although it depends on the species of the oxygen ion-conductive material.

In a case of using a thin oxygen ion-conductive material, a tunneling current should also be taken into consideration. The tunneling current depends on an electric field strength, i.e., the applied voltage per unit thickness. An exemplary oxygen pump device of general use, which employs a zirconia piece with a thickness of 0.5 mm as the oxygen ion-conductive material and where a voltage of 1 V is applied between the both surfaces thereof, develops the field strength of only 20 V/cm. However, if the same voltage of 1 V is applied across a thin film with a thickness of 1 μm, the electric field strength becomes 500 times (1,000 kV/cm), and the tunneling current becomes to an extent that cannot be ignored.

Figure 3:
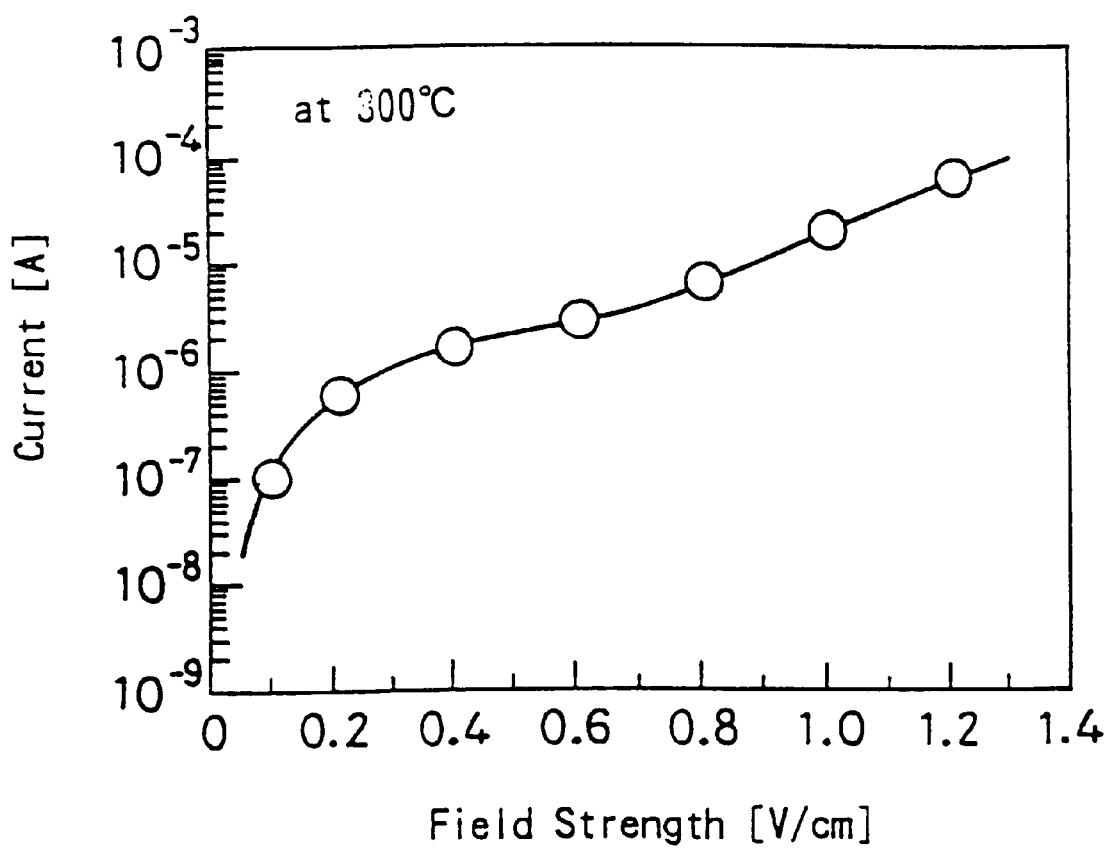
FIG. 3 is a characteristic diagram showing the relationship between a field strength applied to an oxygen ion-conductive film of an oxygen pump device and the current value which flows between the both electrodes of the oxygen pump device.

FIG. 3 shows an electric conductivity of the Ba—Ce—Gd oxide film with a thickness of 1 μm as an example. In deriving this characteristic, the currents which flows between the both electrodes are measured upon applying a voltage of 100–1,200 kV/cm across the both surfaces of the film.

As shown by FIG. 3, the current value increases abruptly up to the field strength of 200 kV/cm. Thereafter, the increase in the current value becomes relatively moderate up to about 800 kV/cm, but at the field strength of not less than that, the tunneling current increases exponentially. Larger the tunneling current, larger the loss in power consumption. In addition, there is also a danger of damaging the film. Therefore, the voltage to be applied to the film is preferably not more than 10,000 kV/cm when converted into field strength. In particular, a high pumping efficiency is obtained when it is selected to 100–1,000 kV/cm.

EXAMPLE 1

Figure 4:
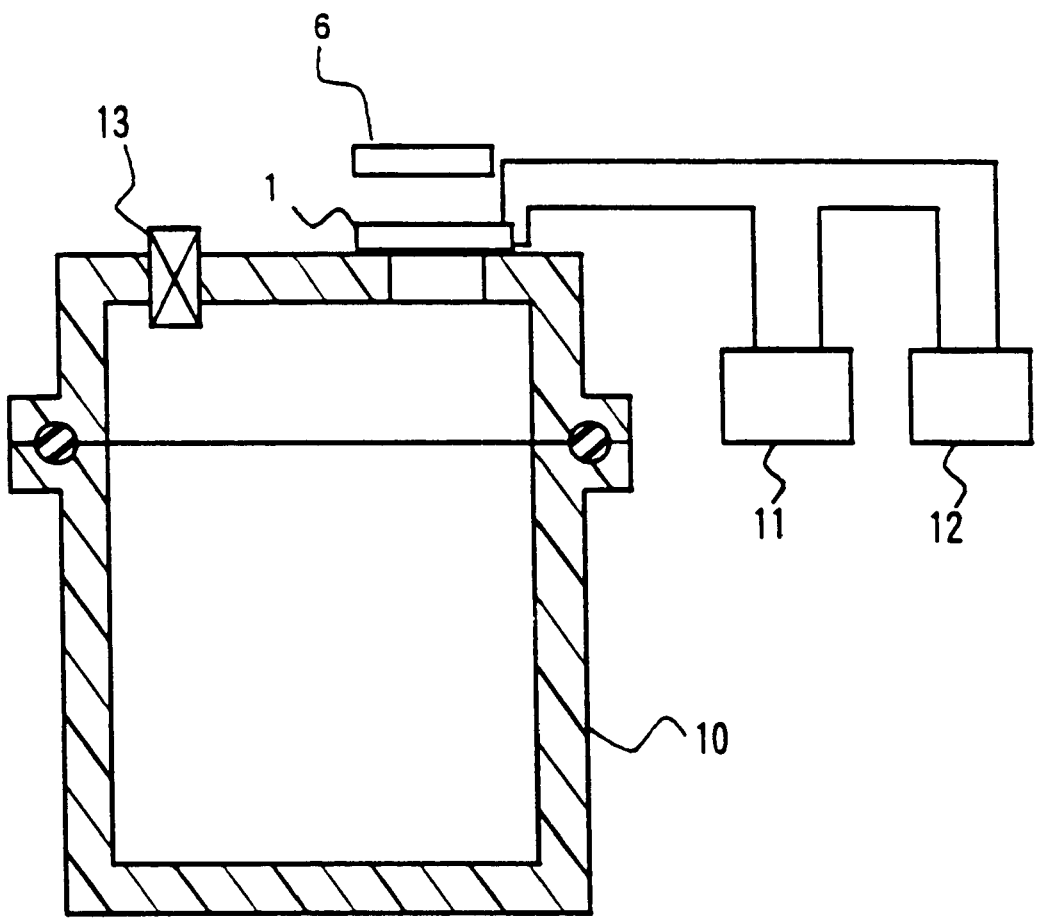
FIG. 4 is a schematic view showing a configuration of a reservoir in the same embodiment of the present invention.

FIG. 4 shows a configuration of the reservoir in accordance with this example.

A container 10 has generally a hermetically sealed structure and accommodates foods such as vegetables and fruits therein. On the top surface of the container 10, an oxygen pump device 1 is provided so as to separate the inside space of the container 10 from the outside environment. A voltage applying means 11 applies a voltage to the oxygen pump device 1. When a direct current voltage is applied by the voltage applying means 11, oxygen existing in the inside space of the container 10 is expelled to the outside environment. The first electrode 3 of the oxygen pump device 1 is exposed to the inside atmosphere of the container 10 through the porous substrate 2, and its second electrode 5 is exposed to the atmosphere outside of the container 10. When a voltage is applied between the first electrode 3 and the second electrode 5 of the oxygen pump device 1, the oxygen pump device 1 takes the oxygen inside the container 10 in and discharge it to the outside environment.

Figure 5:
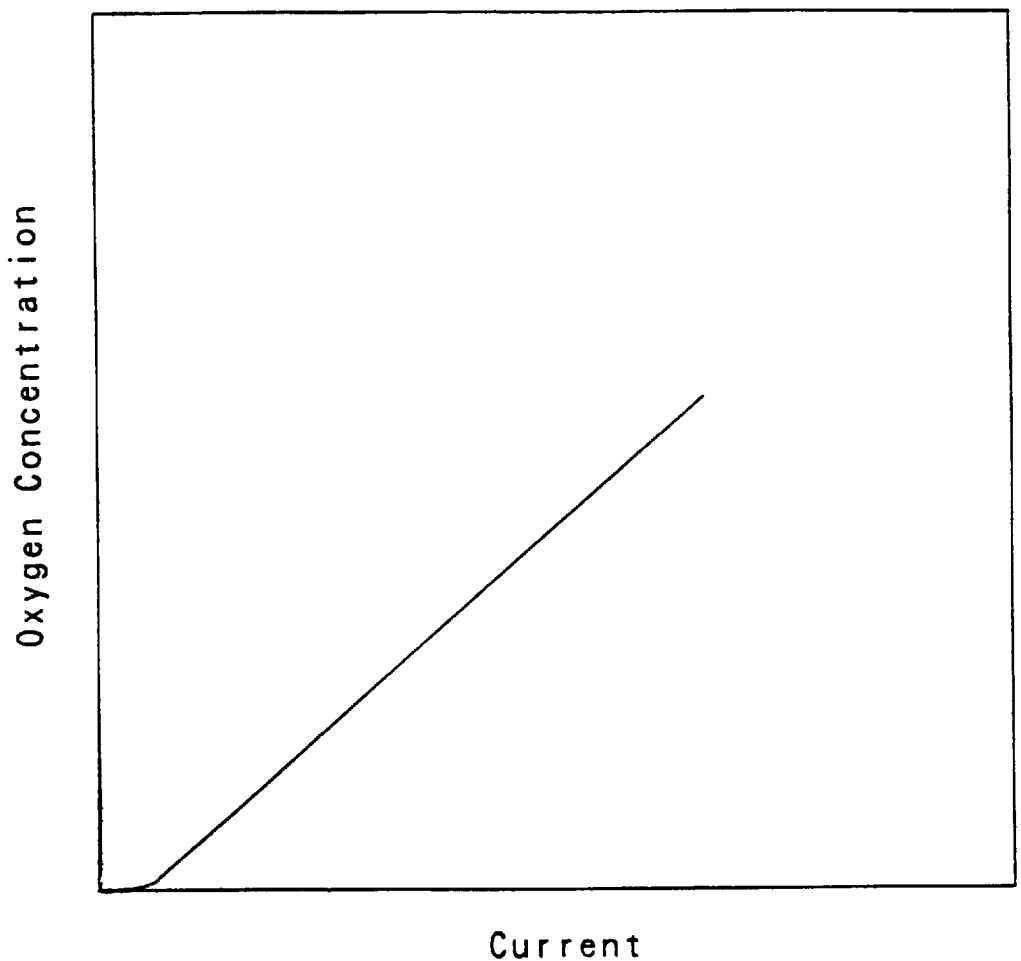
FIG. 5 is a characteristic diagram showing the relationship between the oxygen concentration of the atmosphere surrounding the oxygen pump device and the current value which flows between the both electrodes of the oxygen pump device.

A current detecting unit 12 detects the current value which flows between the first electrode 3 and the second electrode 5. When the oxygen ions is transported through the oxygen ion-conductive film 4 by the application of voltage, a current is flown between the first electrode 3 and the second electrode 5. At that time, the value of the current depends on the oxygen concentration of the atmosphere inside the container 10 as shown in FIG. 5. That is, when the oxygen concentration of the atmosphere inside the container 10 is lowered, the amount of the oxygen supplied to the oxygen pump device 1 decreases and the current value to be detected decreases accordingly. Therefore, if the relationship between the oxygen concentration and the current value which flows between the both electrode has previously been grasped, it is possible to detect the oxygen concentration of the atmosphere inside the container 10 based on the current value. The current detecting unit 12 has previously memorized the relationship between the oxygen concentration and the current value as shown in FIG. 5, and calculates the oxygen concentration of the atmosphere inside the container 10 based on the current value. In this manner, it is possible to measure oxygen concentration without using a separate oxygen concentration meter. There is also a feature of capable of conducting a real time measurement of the oxygen concentration while operating the oxygen pump device 1. The current detecting unit 12 outputs thus obtained data of the oxygen concentration of the atmosphere inside the container 10 to the voltage applying means 11. The voltage applying means 11 can change the applying voltage based on this signal thereby to control the output of the oxygen pump device 1, if necessary.

Incidentally, if the container 10 is hermetically sealed, the inner pressure of the container 10 is lowered by the operation of the oxygen pump device 1. If the foods such as vegetables and fruits are stored under reduced pressure, these are deformed or damaged. Therefore, a check valve 13 is provided on the container 10 for communicating a gas only from the outside towards the inside of the container 10. That is, the check valve 13 permits an inflow of the outside air of an amount equal to that of the oxygen expelled from the inside of the container 10 by the oxygen pump device 1 towards the outside of the container 10. By this means, the oxygen concentration can be lowered under a normal pressure.

In the previously-described reservoir, the required electric power is only such an extent required for the heating by the heater unit 6 and for moving the oxygen ions, and is greatly reduced as compared with a method of refrigerating or freezing the foods. In addition, no separate equipment for supplying carbon dioxide or the like is required and thus it is possible to make the size of the reservoir compact.

EXAMPLE 2

Figure 6:
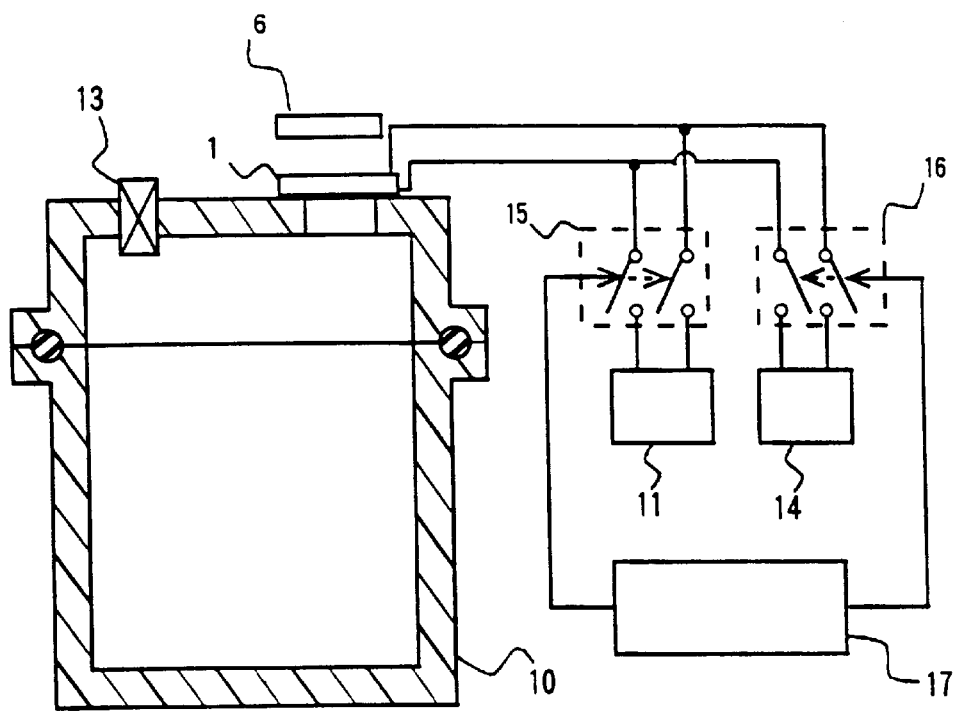
FIG. 6 is a schematic view showing a configuration of a reservoir in another embodiment of the present invention.

FIG. 6 shows a configuration of a reservoir of this example. The configuration of the reservoir is nearly the same as that of the reservoir disclosed in Example 1. In this and the subsequent examples, the same reference numerals used in Example 1 are used without change to designate the same parts and components without additional description. In this example, the oxygen concentration of the atmosphere inside the container 10 is detected based on the electromotive force generated between the first electrode 3 and the second electrode 5. When the oxygen pump device 1 operates and the oxygen concentration of the atmosphere inside the container 10 is lowered, the first electrode 3 and the second electrode 5 are allowed to be exposed to the atmospheres of the different oxygen concentrations, respectively, and the oxygen pump device 1 then acts as a concentration cell. Thus, by detecting the electromotive force generated in the oxygen pump device 1, i.e., a concentration cell, the oxygen concentration of the atmosphere inside the container 10 is derived.

A pair of input terminals of a voltage detecting unit 14 are connected through a switch 16 to the first electrode 3 and the second electrode 5 of the oxygen pump device 1, respectively. A switch 15 is interposed between the oxygen pump device 1 and the voltage applying unit 11. The pairs of switches 15 and 16 are under control of a control unit 17, so that ON of one represents OFF of the other.

During the expelling of the oxygen in the atmosphere inside the container 10, a voltage is applied between the both electrodes of the oxygen pump device 1 by making the switch 15 ON. During the detection of the oxygen concentration in the atmosphere inside the container 10, the electromotive force generated across the both electrodes of the oxygen pump device 1 is measured by the voltage detecting unit 14 by making the switch 16 ON (i.e., the switches 15 OFF).

On the voltage detecting unit 14, an equation representing the relationship between the difference in the oxygen concentrations at the both electrodes and the electromotive force generated based on the difference has previously been memorized. The unit 14 calculates difference between the oxygen concentration inside the container 10 and that of the outside atmosphere. It may here be possible to calculate the oxygen concentration in the container 10 by setting the oxygen concentration of the outside atmosphere to 21% (normal oxygen concentration of the air). The voltage detecting unit 14 outputs the thus obtained data of the oxygen concentration in the container 10 to the voltage applying unit 11. The voltage applying unit 11 changes the voltage to be applied based on this signal thereby to control the output of the oxygen pump device 1, if necessary.

According to this example, it is possible to measure the oxygen concentration in the atmosphere surrounding the articles accommodated in the container. Therefore, there is no need for separately providing an oxygen concentration meter.

EXAMPLE 3

Figure 7:
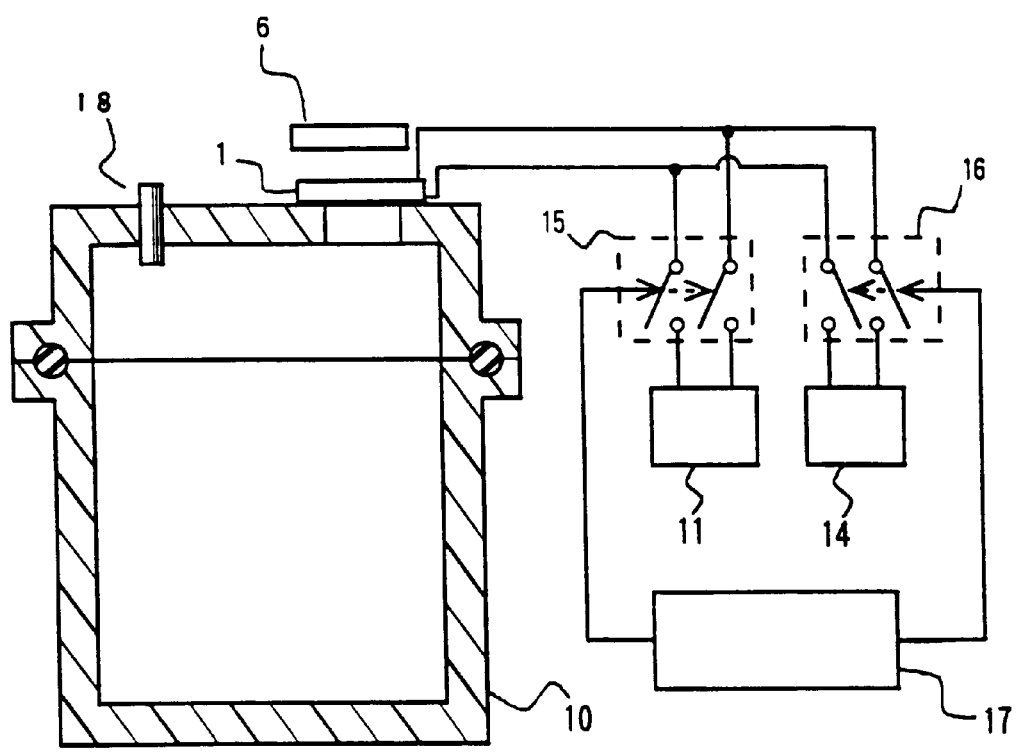
FIG. 7 is a schematic view showing a configuration of a reservoir in still other embodiment of the present invention.

FIG. 7 shows the configuration of this example. The reservoir of this example has a configuration similar to that of the reservoir of Example 2, excepting the provision of a capillary tube 18 which communicate through the inside and the outside of the container 10, in place of the check valve 13 of Example 2 for suppressing the generation of negative pressure. In a case of using the check valve 13, the state of low oxygen concentration inside the container 10 is maintained even if the oxygen pump device 1 is stopped. On the other hand, if the capillary tube 18 is used, the outside atmosphere is constantly entered in and expelled out the container 10 through the hole of the capillary tube 18 and thus the speed of decreasing the oxygen concentration is lowered while the oxygen pump device 1 is operating. However, the oxygen concentration inside the container 10 can be raised rapidly by stopping the oxygen pump device 1.

In general, by storing the foods under a deoxygen atmosphere where oxygen is completely removed, it is possible to prevent the articles from deterioration by oxidation and spoiling or rotting by aerobic organisms such as bacteria and fungi.

However, strictly anaerobic bacteria such as botulinus species grow under the deoxygen atmosphere. In a case where the foods is infected by these strictly anaerobic organisms, the storage of the foods under the deoxygen atmosphere might conversely promote the growth of the strictly anaerobic organisms and thus is dangerous.

In order to cope with this problem, the reservoir of this example uses the capillary tube 18 and permits the oxygen pump device 1 to stop intermittently, thereby to introduce air into the container 10, and thus can sterilize the strictly anaerobic organisms or suppress their growth.

When the oxygen pump device 1 stops, the outside air is introduced into the container 10 and the oxygen concentration inside the container 10 is recovered to that of the outside air. Thereafter, the oxygen concentration inside the container 10 is allowed to decrease by operating the oxygen pump device 1. As described, with only the repetition of the operation and the stop of the oxygen pump device 1, the reservoir of this example can suppress both of the spoiling or rotting by the aerobic organisms and the spoiling or rotting by the anaerobic organisms.

Alternatively, by applying a voltage of reversed polarity to the case of normal operation across the first electrode 3 and the second electrode 5 of the oxygen pump device 1, thereby to send oxygen exists in the outside of the container 10 inside, the atmosphere inside the container 10 may transitory be made an oxygen-rich state for sterilizing the anaerobic organisms.

As described previously, according to the present invention, since the foods can be stored without using a freezing equipment, it is possible to realize a compact size and small power consumption of the reservoir.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A reservoir comprising:
   a container for storing articles therein,
   an oxygen pump device for expelling oxygen in said container to the outside, which comprises: a porous substrate; a gas-permeable first electrode formed on said porous substrate; an oxygen ion-conductive electrolyte film formed on said first electrode; and a gas-permeable second electrode formed on said oxygen ion-conductive electrolyte film, wherein at least a portion of said first electrode being exposed to the inside of said container through the porous substrate and said second electrode being disposed to the outside,
   a heater for heating said oxygen ion-conductive electrolyte film, and
   a voltage supply device for applying a voltage between said first and second electrodes.

2. The reservoir in accordance with claim 1, wherein the thickness of said oxygen ion-conductive electrolyte film is 0.5–10 $\mu$m.

3. The reservoir in accordance with claim 1, further comprising: a current detection means for measuring a current which flows between said first and second electrodes; and a calculation unit for calculating an oxygen concentration in said container based on the measured current value.

4. The reservoir in accordance with claim 1, further comprising: a voltage detecting means for measuring a potential difference between said first and second electrodes; and a calculating unit for calculating an oxygen concentration in said container based on the measured potential difference.

5. A method for storing articles, employing an oxygen pump device comprising:

a porous substrate;

a gas-permeable first electrode formed on said porous substrate;

an oxygen ion-conductive electrolyte film formed on said first electrode; and a gas-permeable second electrode formed on said oxygen ion-conductive electrolyte film; the method comprising the steps of:

storing an article in a container in which at least a portion of said first electrode is exposed to the inside of said container through the porous substrate and said second electrode to the outside;

lowering the oxygen concentration inside said container by applying a voltage between said first and second electrodes while heating said oxygen ion-conductive electrolyte film.

6. The method for storing articles in accordance with claim 5, wherein said oxygen concentration inside said container is temporarily recovered by exposing the inside of said container to the outside atmosphere.

7. The method for storing articles in accordance with claim 5, wherein a current which flows between said first and second electrodes is detected when the voltage is applied between said first and second electrodes so as to discharge oxygen inside said container to the outside, and the oxygen concentration inside said container is calculated on the basis of the detected current value.

8. The method for storing articles in accordance with claim 5, wherein a potential difference between said first and second electrodes is detected after removing the application of voltage to the both electrodes, and the oxygen concentration inside said container is calculated on the basis of the detected potential difference.

* * * * *